US012092295B2

(12) United States Patent
Li et al.

(10) Patent No.: US 12,092,295 B2
(45) **Date of Patent: *Sep. 17, 2024**

(54) LIGHT FIXTURE CONNECTION SYSTEM AND OPTIC HOLDER

(71) Applicant: HLI SOLUTIONS, INC., Greenville, SC (US)

(72) Inventors: Qianshan Li, Glendora, CA (US); Kevin Lu, Fountain Valley, CA (US); Syed Raza, Rancho Palos Verdes, CA (US); Dean Dal Ponte, Glendale, CA (US)

(73) Assignee: HLI SOLUTIONS, INC., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,209

(22) Filed: Jul. 18, 2023

(65) Prior Publication Data

US 2023/0358390 A1 Nov. 9, 2023

Related U.S. Application Data

(62) Division of application No. 17/321,339, filed on May 14, 2021, now Pat. No. 11,746,990.

(Continued)

(51) Int. Cl.

*F21V 15/01* (2006.01)
*F21V 19/00* (2006.01)

(Continued)

(52) U.S. Cl.

CPC .......... *F21V 15/01* (2013.01); *F21V 19/0035* (2013.01); *F21V 23/06* (2013.01); *F21Y 2103/10* (2016.08); *F21Y 2115/10* (2016.08)

(58) Field of Classification Search

CPC ...... F21V 15/01; F21V 19/0035; F21V 23/06; F21Y 2103/10

See application file for complete search history.

(56) References Cited

U.S. PATENT DOCUMENTS 4,413,311 A * 11/1983 Orenstein ............. F21V 19/008 362/362
8,206,004 B2 * 6/2012 Serak ..................... H01R 31/02 362/217.1

(Continued)

OTHER PUBLICATIONS

Information Disclosure Statement filed on Jan. 19, 2022 in connection with U.S. Appl. No. 17/321,339.

(Continued)

*Primary Examiner* — Matthew J. Peerce

(74) *Attorney, Agent, or Firm* — Buckley, Maschoff & Talwalkar LLC

(57) ABSTRACT

A connection assembly includes an electrical cord providing electrical communication between a first light fixture and a second light fixture, and a cover removably coupled to the first light fixture and the second light fixture. The electrical cord includes a first electrical connector coupled to the first light fixture, and a second electrical connector coupled to the second light fixture. The cover extends over the electrical cord, and includes a first end adjacent the first light fixture, a second end adjacent the second light fixture, and a surface extending between the first end and the second end. The cover provides a continuous surface between the first light fixture and the second light fixture.

7 Claims, 8 Drawing Sheets

Related U.S. Application Data

(60) Provisional application No. 63/025,906, filed on May 15, 2020.

(51) Int. Cl.

| | |
|---|---|
| ***F21V 23/06*** | (2006.01) |
| ***F21Y 103/10*** | (2016.01) |
| ***F21Y 115/10*** | (2016.01) |

(56) References Cited

U.S. PATENT DOCUMENTS

| | | | | |
|---|---|---|---|---|
| 8,398,276 | B2 | 3/2013 | Pearson et al. | |
| 8,454,193 | B2 * | 6/2013 | Simon | F21K 9/27 362/221 |
| 9,188,290 | B2 * | 11/2015 | Lay | F21V 23/009 |
| 9,897,294 | B2 | 2/2018 | Pearson et al. | |
| 9,964,289 | B2 | 5/2018 | Pearson et al. | |
| 10,180,241 | B1 | 1/2019 | Van Winkle | |
| 10,794,580 | B1 | 10/2020 | Su et al. | |
| 11,060,711 | B1 | 7/2021 | Illouz | |
| 11,255,521 | B1 | 2/2022 | McCane et al. | |
| 2003/0223231 | A1 | 12/2003 | McCarthy et al. | |
| 2004/0256000 | A1 * | 12/2004 | Konstantin | E04D 3/06 136/251 |
| 2014/0268720 | A1 | 9/2014 | Dungan et al. | |
| 2016/0003457 | A1 | 1/2016 | Pearson et al. | |
| 2017/0292664 | A1 | 10/2017 | Pearson et al. | |
| 2018/0031189 | A1 | 2/2018 | Pearson et al. | |
| 2019/0162394 | A1 | 5/2019 | Guerra et al. | |

OTHER PUBLICATIONS

PCT/US2021/032631 International Search Report and Written Opinion dated Oct. 18, 2021 (16 pages).

892 Form dated May 16, 2022 which was received in connection with U.S. Appl. No. 17/321,339.

Notice of Allowance dated Apr. 19, 2023 which was received in connection with U.S. Appl. No. 17/321,339.

* cited by examiner

LIGHT FIXTURE CONNECTION SYSTEM AND OPTIC HOLDER

REFERENCE TO RELATED APPLICATION

The present application is a divisional of U.S. patent application Ser. No. 17/321,339 which was filed on May 14, 2021 and which claims the benefit of prior-filed, U.S. Provisional Patent Application No. 63/025,906, filed May 15, 2020, the entire contents of which are incorporated by reference.

FIELD

The present disclosure relates to light fixtures, and particularly to connection for coupling multiple fixtures to one another.

SUMMARY

In one independent aspect, a connection assembly is provided for coupling a plurality of light fixtures. The connection assembly includes an electrical cord providing electrical communication between a first light fixture and a second light fixture, and a cover removably coupled to the first light fixture and the second light fixture. The electrical cord includes a first electrical connector coupled to the first light fixture, and a second electrical connector coupled to the second light fixture. The cover extends over the electrical cord, and the cover includes a first end adjacent the first light fixture, a second end adjacent the second light fixture, and a surface extending between the first end and the second end. A portion of the cover surface adjacent the first end has a profile that corresponds to a profile of a surface of the first light fixture, and a portion of the cover surface adjacent the second end having a profile that corresponds to a profile of a surface of the second light fixture, providing a continuous surface between the first light fixture and the second light fixture.

In some aspects, the connection assembly further includes a bracket configured to be coupled to the first light fixture, the cover coupled to the bracket.

In some aspects, the bracket is configured to be coupled to the first light fixture by a first fastener, and the cover is coupled to the bracket by a second fastener.

In some aspects, the bracket is a first bracket, further comprising a second bracket configured to be coupled to the second light fixture, the cover coupled to the second bracket.

In some aspects, the bracket includes a first portion configured to be coupled to the first light fixture and a second portion configured to be coupled to the first light fixture, wherein the first electrical connector is positioned between the first portion and the second portion.

In some aspects, the first portion of the bracket includes a first flange oriented parallel to a first portion of the cover, the first flange including a hole for receiving a fastener extending through the first portion of the cover.

In some aspects, the second portion of the bracket includes a second flange oriented parallel to a second portion of the cover, the second flange including a hole for receiving a fastener extending through the second portion of the cover.

In another independent aspect, a system of interconnected light fixtures includes a first light fixture, a second light fixture, an electrical cord providing electrical communication between the first light fixture and a second light fixture, and a cover removably coupled to the first light fixture and the second light fixture. The first light fixture includes an elongated first housing and a first light emitting element, and the first housing includes a first end, a second end, and a first electrical connector. The second light fixture includes an elongated second housing and a second light emitting element, and the second housing includes a first end, a second end, and a second electrical connector. The electrical cord includes a third electrical connector removably coupled to the first electrical connector, and a fourth electrical connector removably coupled to the second electrical connector. The cover extends over the electrical cord, the cover including a first end adjacent the first light fixture, a second end adjacent the second light fixture, and a surface extending between the first end and the second end. A portion of the cover surface adjacent the first end having a profile that corresponds to a profile of a surface of the first light fixture, and a portion of the cover surface adjacent the second end having a profile that corresponds to a profile of a surface of the second light fixture, providing a continuous surface between the first light fixture and the second light fixture.

In some aspects, the system further includes a bracket coupled to the first light fixture, the cover coupled to the bracket.

In some aspects, the bracket is coupled to the first light fixture by a first fastener, and the cover is coupled to the bracket by a second fastener.

In some aspects, the bracket is a first bracket, further comprising a second bracket coupled to the second light fixture, the cover coupled to the second bracket.

In some aspects, the bracket includes a first portion coupled to the first light fixture and a second portion coupled to the first light fixture, wherein the first electrical connector is positioned between the first portion and the second portion.

In some aspects, the first portion of the bracket includes a first flange oriented parallel to a first portion of the cover, the first flange including a hole for receiving a fastener extending through the first portion of the cover.

In some aspects, the second portion of the bracket includes a second flange oriented parallel to a second portion of the cover, the second flange including a hole for receiving a fastener extending through the second portion of the cover.

In some aspects, the first housing includes a first portion and a second portion, the first portion including an opening through which light from the first light emitting element passes, the second portion positioned on side of the first portion opposite the opening, the second portion having a length less than a length of the first portion of the housing, the first electrical connector being positioned on the second portion of the housing.

In some aspects, the first end of the cover is positioned adjacent a surface of the second portion.

In some aspects, an end of the second portion proximate the cover is configured to be selectively coupled to an end plate.

In yet another independent aspect, a light fixture includes a housing, a plurality of light emitting diodes supported on an LED board, the LED board supported in the housing, a plurality of optics, and a unitary optic holder body supporting the optics. Each of the optics is positioned adjacent an associated one of the light emitting elements. The optic holder body is supported within the housing.

In some aspects, the optic holder body includes a plurality of recesses, each of the recesses associated with one of the optics, the optic holder body including a plurality of snap fit features, each of the snap fit features securing an associated one of the optics.

In some aspects, the optic holder body includes a plurality of recesses, each of the recesses having a substantially frustoconical shape.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
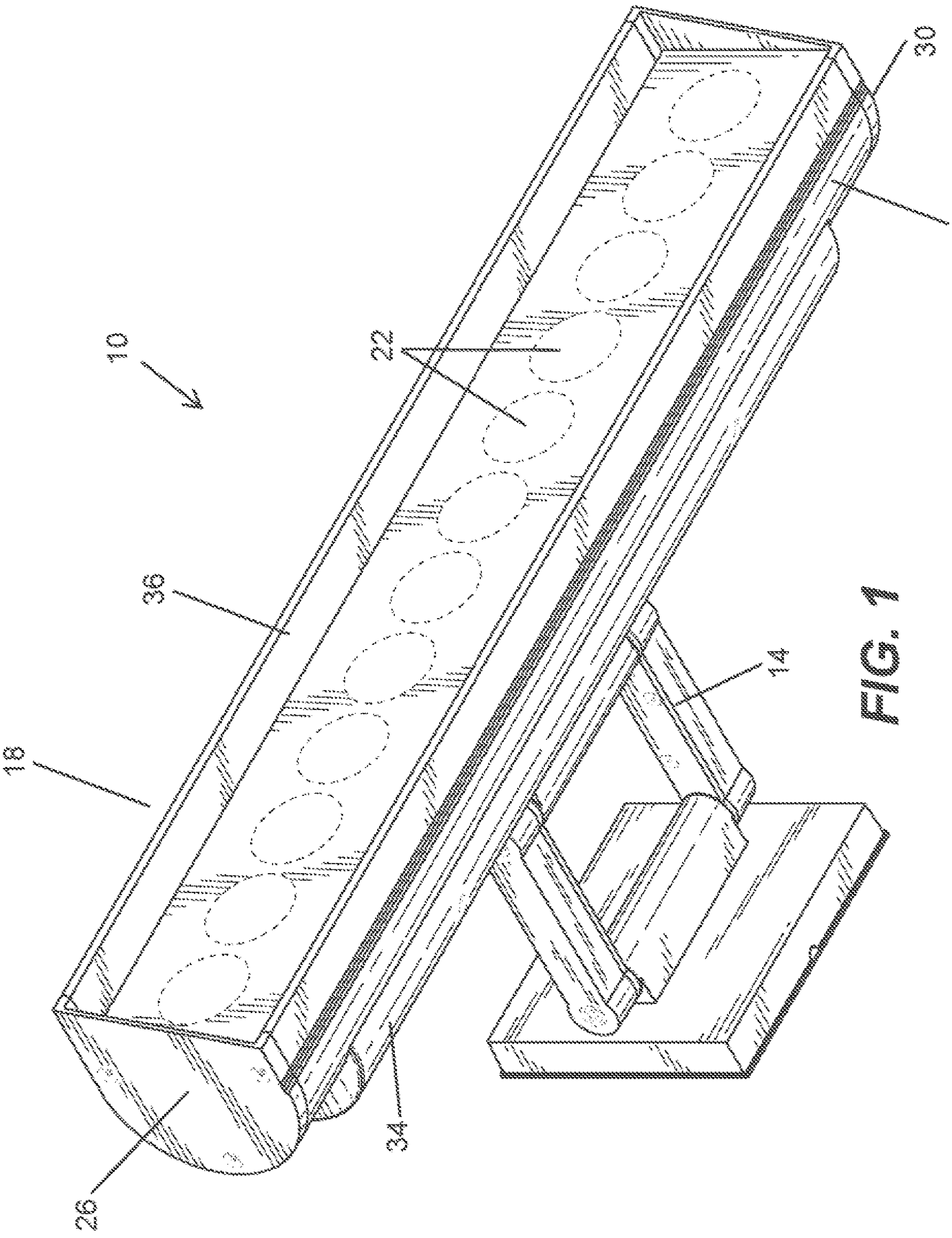
FIG. 1 is a perspective view of a light fixture.
Figure 2:
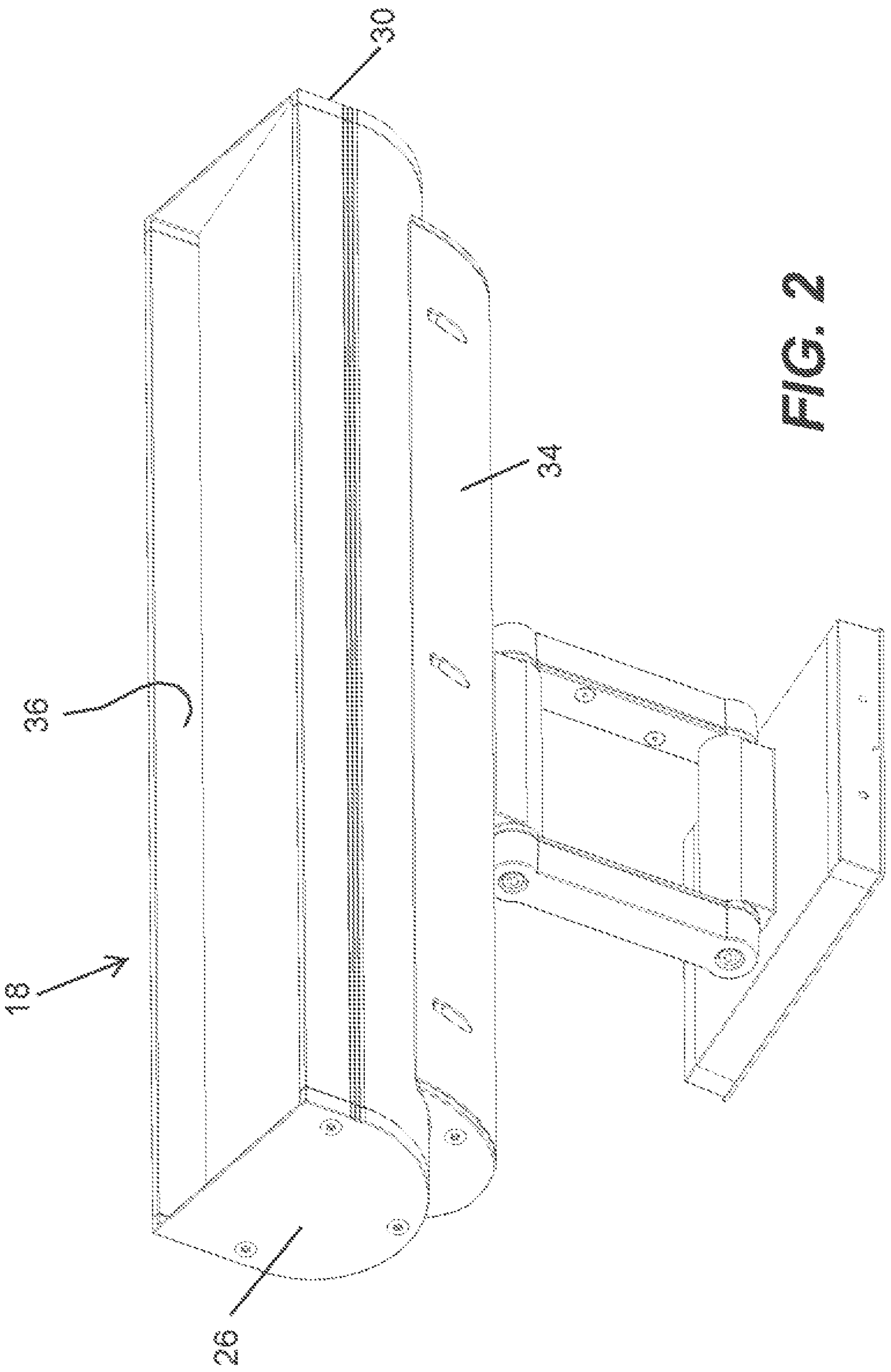
FIG. 2 is another perspective view of the light fixture of FIG. 1.

FIGS. 1 and 2 illustrate a light fixture 10 (e.g., a wall-mounted fixture) including a housing 18 supporting a plurality of light emitting elements 22 (e.g., LEDs—FIG. 1). The light fixture 10 is supported on a surface (e.g., a wall, not shown) by a support structure (e.g., a support arm 14). In the illustrated embodiment, the housing 18 is elongated and includes a first end 26 and an opposite second end 30. In addition, the housing 18 includes first portion or main portion 32 and a second portion or support portion 34. The main portion 32 includes an opening 36 through which light emitted by the light emitting elements 22 passes. The support portion 34 is positioned on a side of the main portion opposite the opening 36. In the illustrated embodiment, the support portion 34 has a shorter length than the main portion 32. Stated another way, the support portion 34 extends a portion of the length between the first end 26 and the second end 30. In the illustrated embodiment, a driver (not shown) is supported in a compartment of the housing 18.

Figure 3:
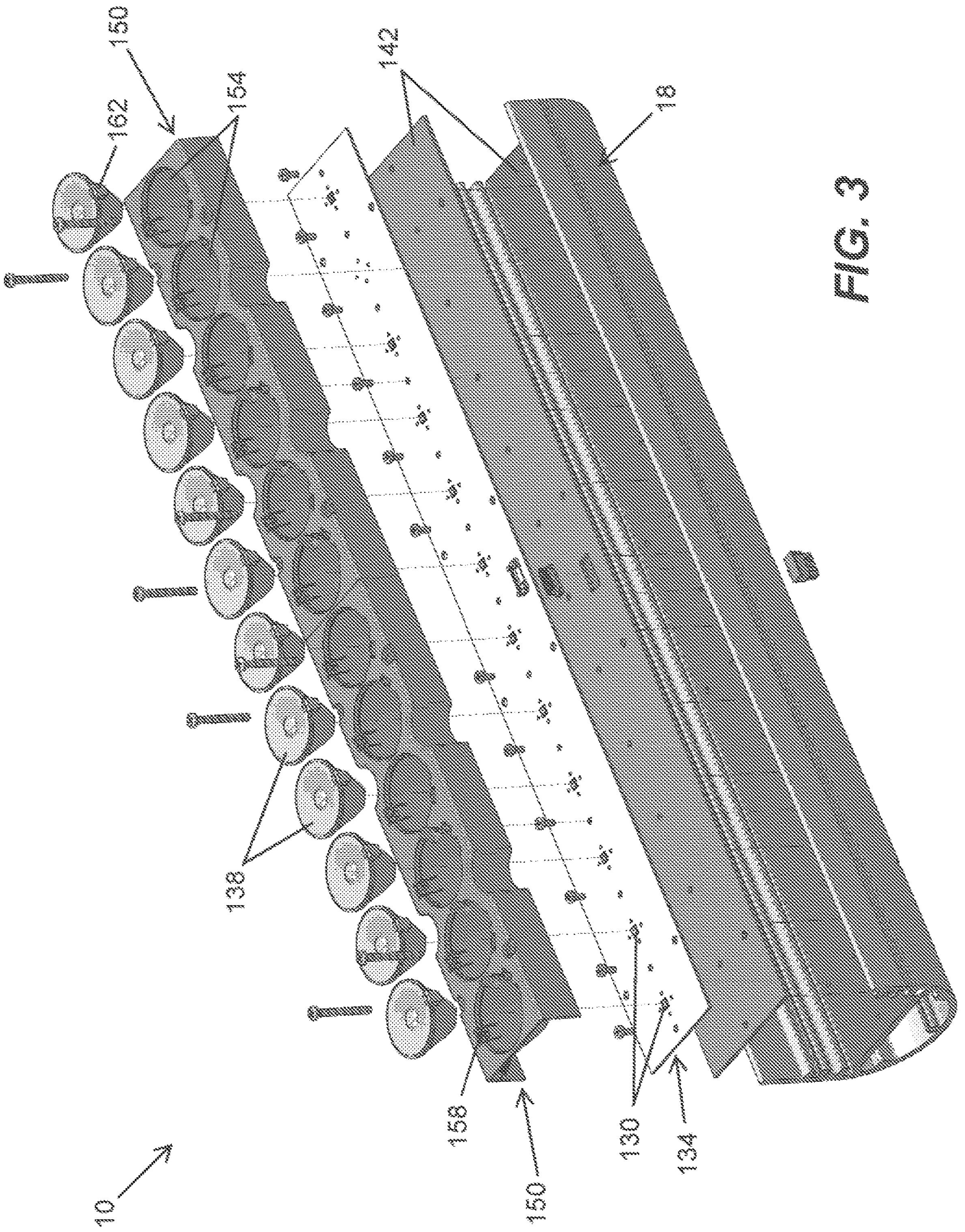
FIG. 3 is an exploded view of a portion of the light fixture of FIG. 1.

As shown in FIG. 3, in the illustrated embodiment, the light fixture 10 includes a light assembly including a plurality of light emitting diodes or LEDs 130 supported on a circuit board or LED board 134. In addition, an optic 138 (e.g., a TIR optic) is associated with each LED 130. In some embodiments, the optic 138 may be a total internal reflection (TIR) optic having one end positioned adjacent the associated LED 130, and another end through which light is output. The LED board 134 is supported in the housing 18, and is in electrical communication with a driver (not shown) via one or more electrical connectors. In the illustrated embodiment, the LED board 134 is coupled to one or more support members 142 positioned in the housing 18.

The optics 138 are supported in a holder body 150. The holder body 150 includes recesses 154, each of which receives one of the optics 138. In the illustrated embodiment, each recess 154 has a shape that is substantially similar to the shape of the outer surface of the optic 138 (for example, a frustoconical shape). In addition, the holder body 150 includes a retention feature 158 (e.g., a tab or detent) adjacent each recess 154, and each optic 138 includes a complementary feature 162 for engaging the retention feature 158 to provide a snap fit feature between each recess 154 and the associated optic 138. In the illustrated embodiment, the holder body 150 supports six optics 138, and the housing 18 supports two holder bodies 150; in other embodiments, the holder body may be configured to support fewer or more optics, and/or the housing may be configured to support fewer or more holder bodies. The holder body 150 is secured (e.g., by fasteners) to a support surface 142 in the housing 18. In contrast to conventional designs that include discrete or separate optic holders, the unitary holder body 150 facilitates easier assembly of optics into the holder body 150, and easier assembly of the optics into the housing 18. The orientation of each optic is secured to avoid the need to individually adjust or position each optic.

Figure 4:
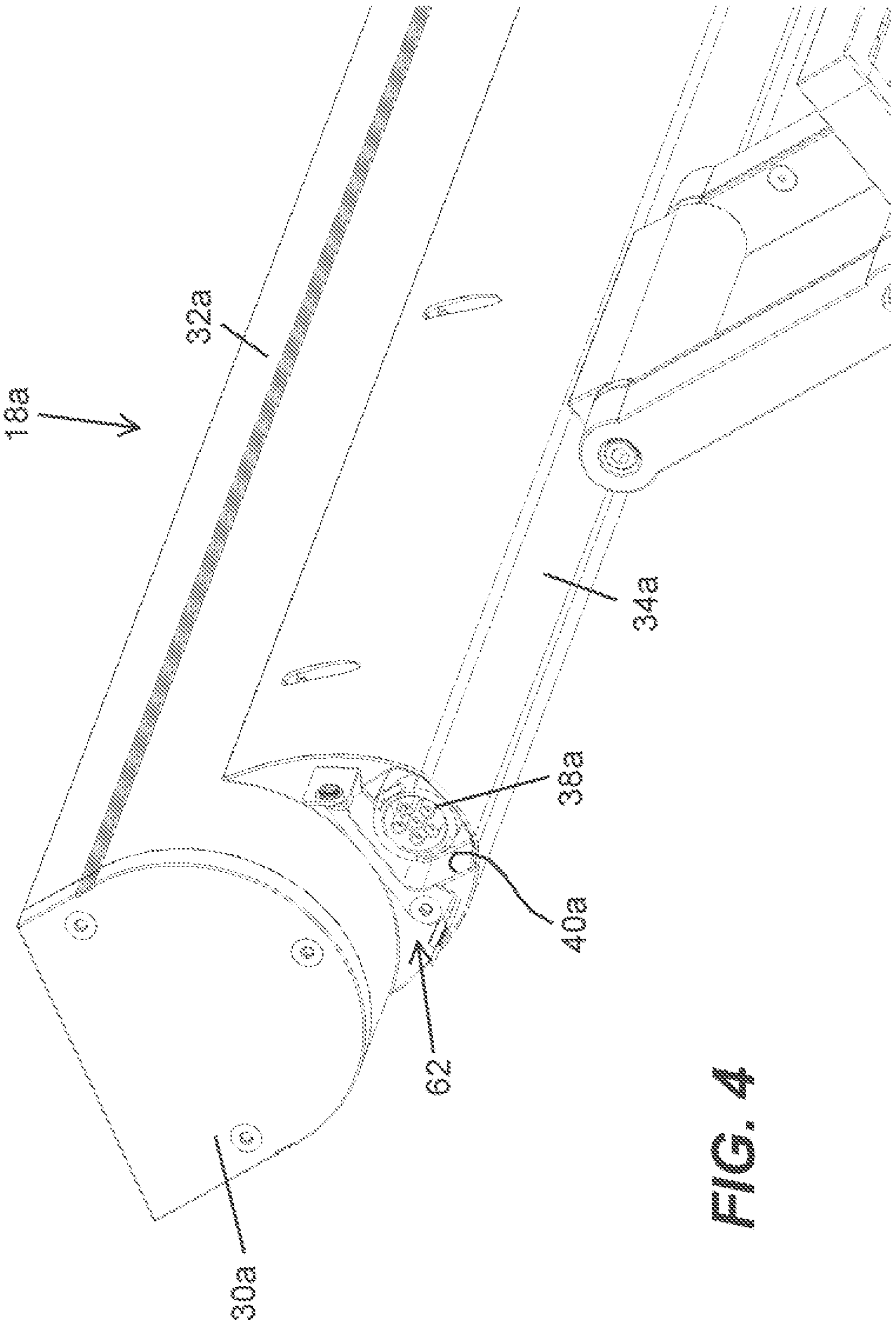
FIG. 4 is an enlarged perspective view of a portion of the light fixture of FIG. 1 with an end plate removed.
Figure 5:
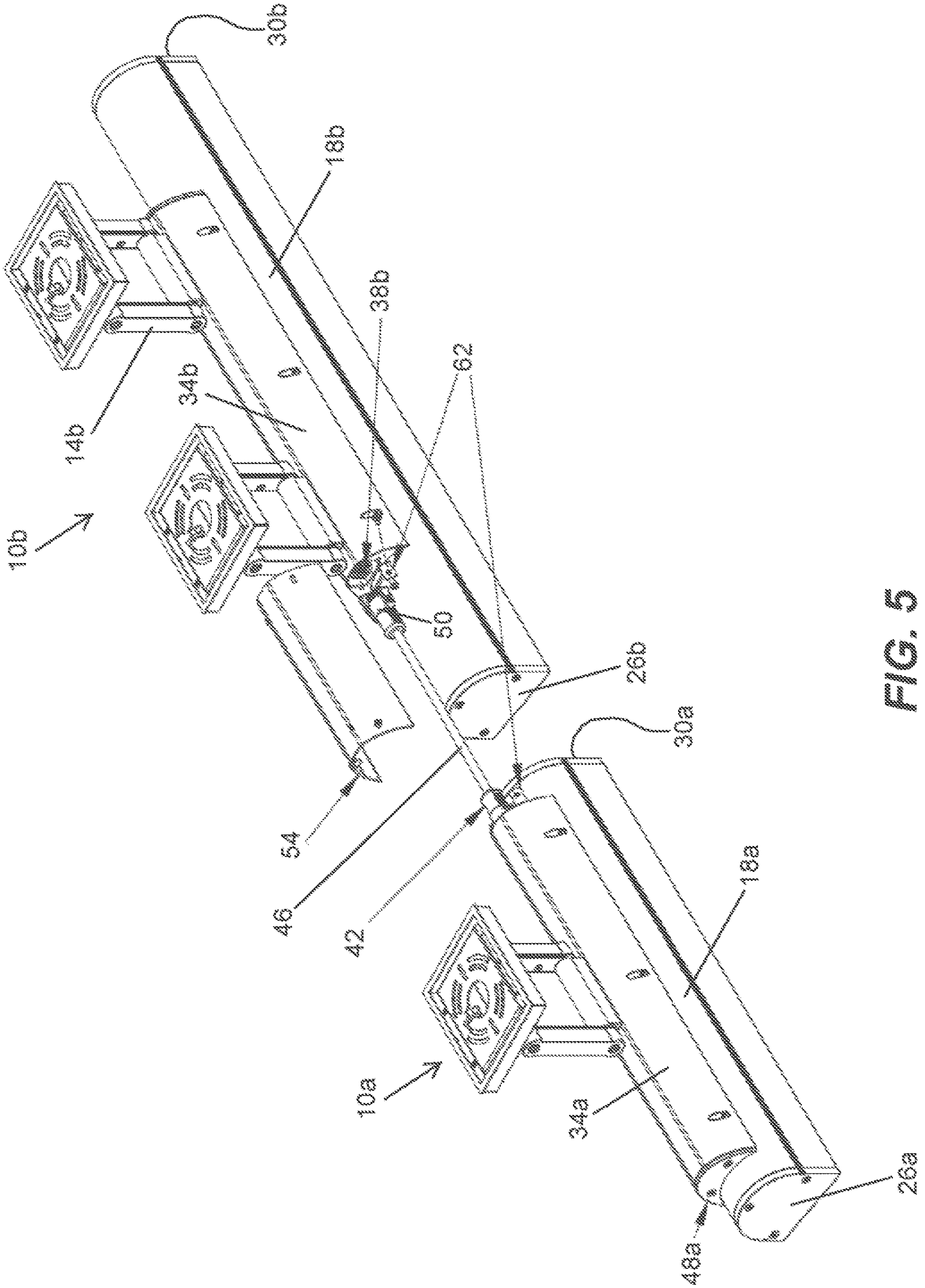
FIG. 5 is a partially exploded view of the light fixture of FIG. 1 coupled to another light fixture.

Referring now to FIGS. 4 and 5, the light fixture 10 (hereinafter referred to as a first light fixture 10*a*) may be connected to a second light fixture 10*b*. As described herein, features of the first light fixture 10*a* are identified with reference numbers having an "a" suffix, while features of the second light fixture 10*b* are identified with reference numbers having a "b" suffix.

As best shown in FIG. 4, in the illustrated embodiment, an electrical connector (e.g., a receptacle 38*a*) is positioned proximate the second end 30*a* of the housing 18*a* (for example, on an end surface of the support portion 34*a*). The receptacle 38*a* may be positioned in a recess 40*a* such that the receptacle 38*a* does not protrude from an end of the support portion 34*a*. When not in use, the receptacle 38*a* may be covered by an end plate or end cover 48*a* (FIG. 5). The receptacle 38*a* engages a connector 42 of an electrical cable 46 (FIG. 5). Similarly, a receptacle 38*b* is positioned proximate a first end 26*b* of a housing 18*b* of the second fixture 10*b* (e.g., on an end surface of support portion 34*a*), and the receptacle of the second fixture 10*b* engages another connector 50 of the cable 46.

Figure 8:
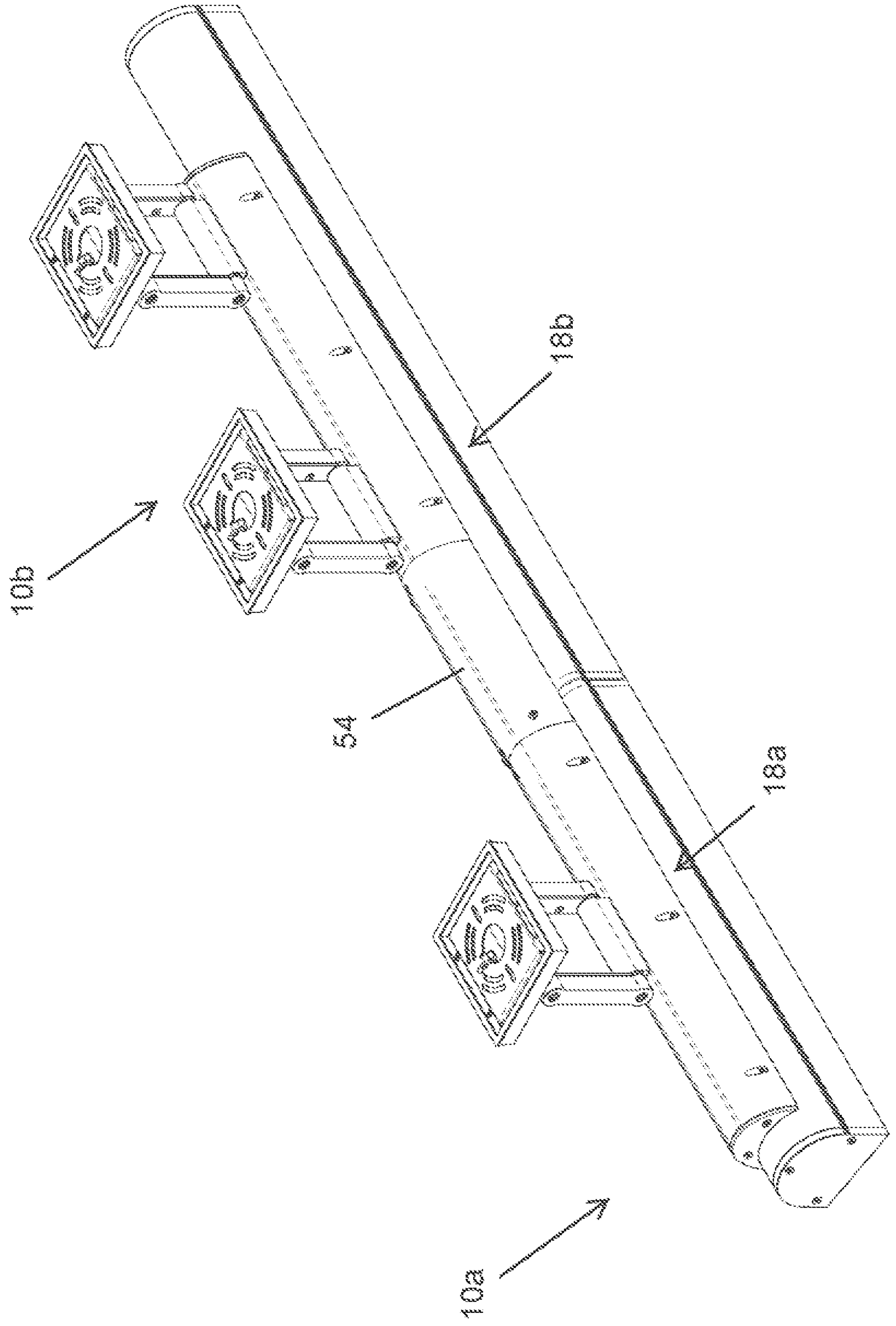
FIG. 8 is a perspective view of the light fixture of FIG. 1 coupled to another light fixture.

A cover 54 is removably coupled to the housings 18*a*, 18*b* to enclose the cable 46 and the connectors 42, 50 and protect them against the environment. In the illustrated embodiment, and as best shown in FIG. 8, the cover 54 has a similar shape to the surfaces of the housings 18*a*, 18*b* that are adjacent the receptacles 38*a*, 38*b* (that is, the surfaces of the support portions 34*a*, 34*b*), thereby providing a continuous appearance between the light fixtures 10*a*, 10*b*. Stated another way, the cover 54 has a first end positioned adjacent the first fixture 10*a* and a second end positioned adjacent the second fixture 10*b*. A portion of the outer surface of the cover 54 adjacent the first end of the cover has a profile that corresponds to (e.g., is substantially continuous with) a profile of a surface of the adjacent portion of the first light fixture 18*a*. Similarly, a portion of the outer surface of the cover 54 adjacent the second end of the cover has a profile that corresponds to (e.g., is substantially continuous with) a profile of a surface of the adjacent portion of the second light fixture 18*b*. As a result, the cover 54 provides a continuous profile between the first light fixture and the second light fixture.

Figure 6:
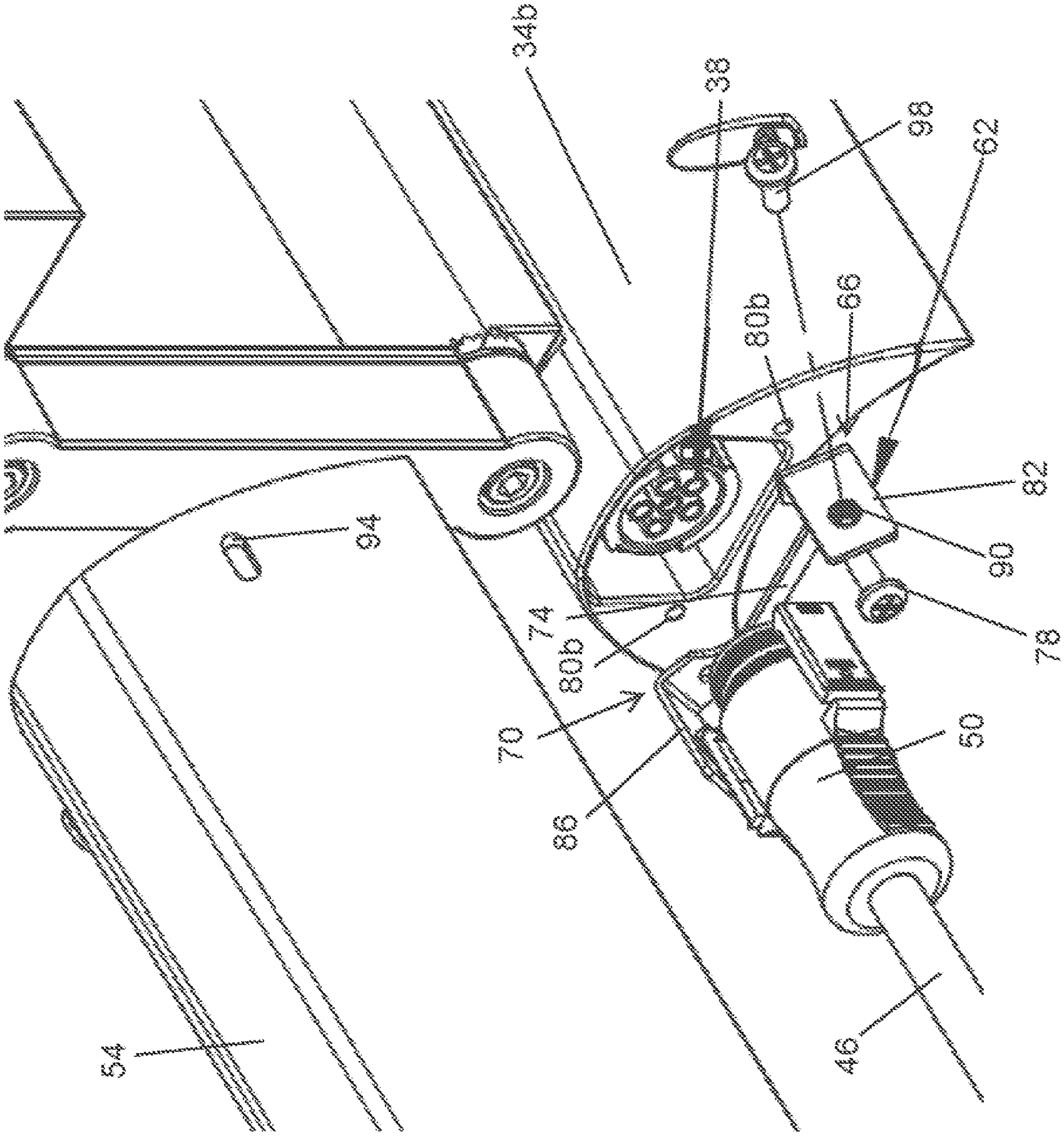
FIG. 6 is an enlarged view of a portion of the assembly of FIG. 5.
Figure 7:
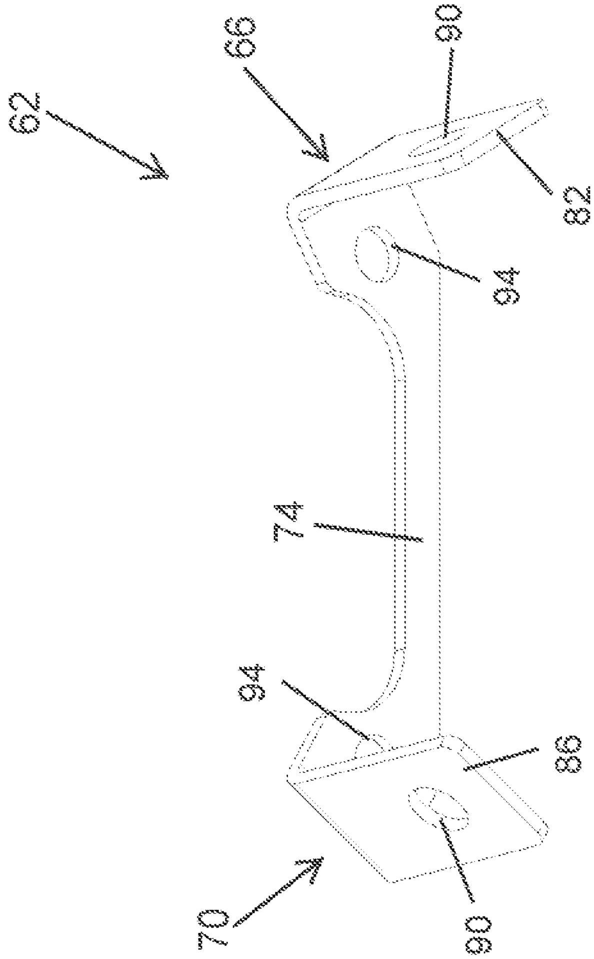
FIG. 7 is a perspective view of a bracket.

As shown in FIGS. 6 and 7, the cover 54 is coupled to the second light fixture 10*b* by a bracket 62. The bracket 62 includes a first portion 66, a second portion 70, and an intermediate portion 74 connected the first portion 66 and the second portion 70. Each of the first portion 66 and the second portion 70 is coupled to the housing 18*b* (e.g., by fasteners 78 (FIG. 6) extending through the first portion 66 and second portion 70 and engaging openings 80 in the support portion 34*b* of the housing 18*b*). In the illustrated embodiment, the fasteners 78 may engage the same holes in the housing 18*b* by which an associated end cover (FIG. 5) can be coupled to the support portion 34*b* when the bracket 62 is not in place. The first portion 66 and the second portion 70 are positioned on opposite sides of the connector 50.

The first portion 66 includes a first standoff or first flange 82 and the second portion 70 includes a second standoff or second flange 86, and the flanges 82, 86 are coupled to the cover 54. In the illustrated embodiment, each of the first flange 82 and the second flange 86 includes a hole 90, and the first portion 66 and second portion 70 each include a hole 94 through which the fasteners 78 may pass to engage the holes 80*b*. As shown in FIG. 6, when the cover 54 is positioned adjacent the housing 18, slots 94 positioned in the cover 54 are aligned with the holes 90. The portion of the cover 54 through which the slots 94 extend may be formed substantially planar in order to facilitate coupling with the flanges 82, 86. A fastener 98 is passed through an associated slot 94 and hole 90 to secure the cover 54 to the bracket 62. In some embodiments, the fastener 98 may engage a nut on an inner side of the flange; in other embodiments, the hole 90 itself may be threaded. It is understood that the cover 54 is coupled to the first light fixture 10*a* in a similar manner. Also, in other embodiments, the first portion and second portion of the bracket may be separate components. The light fixtures 10, 10*a* may be spaced apart by a predetermined distance that permits the cover 54 to be coupled to both brackets 62.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. A connection assembly for coupling a plurality of light fixtures, the connection assembly comprising:

an electrical cord providing electrical communication between a first light fixture and a second light fixture, the electrical cord including a first electrical connector coupled to the first light fixture, and a second electrical connector coupled to the second light fixture;

a bracket configured for coupling to the first light fixture, wherein the bracket includes a first portion configured to be coupled to the first light fixture and a second portion configured to be coupled to the first light fixture, and wherein the first electrical connector is positioned between the first portion and the second portion; and a cover removably coupled to the first light fixture via the bracket and removably coupled to the second light fixture, the cover extending over the electrical cord, the cover including a first end adjacent the first light fixture, a second end adjacent the second light fixture, and a cover surface extending between the first end and the second end, a portion of the cover surface adjacent the first end having a profile that corresponds to a profile of a surface of the first light fixture, and a portion of the cover surface adjacent the second end having a profile that corresponds to a profile of a surface of the second light fixture, providing a continuous surface between the first light fixture and the second light fixture.

2. The connection assembly of claim 1, wherein the bracket is configured to be coupled to the first light fixture by a first fastener, and the cover is coupled to the bracket by a second fastener.

3. The connection assembly of claim 1, wherein the first portion of the bracket includes a first flange oriented parallel to a first portion of the cover, the first flange including a hole for receiving a fastener extending through the first portion of the cover.

4. The connection assembly of claim 1, wherein the second portion of the bracket includes a second flange oriented parallel to a second portion of the cover, the second flange including a hole for receiving a fastener extending through the second portion of the cover.

5. The connection assembly of claim 1, further comprising a second bracket configured for coupling to the second light fixture, wherein the second bracket includes a first portion configured to be coupled to the second light fixture and a second portion configured to be coupled to the second light fixture, and wherein the second electrical connector is positioned between the first portion and the second portion of the second bracket.

6. The connection assembly of claim 5, wherein the second bracket is configured to be coupled to the second light fixture by a third fastener, and the cover is coupled to the second bracket by a fourth fastener.

7. The connection assembly of claim 5, wherein the first portion of the second bracket includes a first flange oriented parallel to a third portion of the cover, the first flange of the second bracket including a hole for receiving a fastener extending through the third portion of the cover.

* * * * *